(12) United States Patent
Morioka

(10) Patent No.: US 8,209,502 B2
(45) Date of Patent: Jun. 26, 2012

(54) SEMICONDUCTOR INTEGRATED CIRCUIT AND ACCESS CONTROLLING METHOD OF SEMICONDUCTOR MEMORY

(75) Inventor: Kiyonori Morioka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 471 days.

(21) Appl. No.: 12/562,101

(22) Filed: Sep. 17, 2009

(65) Prior Publication Data

US 2010/0011175 A1 Jan. 14, 2010

Related U.S. Application Data

(63) Continuation of application No. PCT/JP2007/000273, filed on Mar. 20, 2007.

(51) Int. Cl.
*G06F 12/00* (2006.01)
*G06F 12/10* (2006.01)
*G09G 5/00* (2006.01)

(52) U.S. Cl. ............ 711/154; 711/E12.001; 345/569; 345/619

(58) Field of Classification Search ............ None
See application file for complete search history.

(56) References Cited

U.S. PATENT DOCUMENTS

| 5,210,822 A * | 5/1993 | Tsuchiya et al. ........... 345/569 |
| 5,239,512 A | 8/1993 | Fautier et al. |
| 5,293,596 A | 3/1994 | Toyokura et al. |
| 2007/0174506 A1* | 7/2007 | Tsuruta ............ 710/22 |

FOREIGN PATENT DOCUMENTS

| JP | 63-234361 A | 9/1988 |
| JP | 4-213775 A | 8/1992 |
| JP | 4-218847 A | 8/1992 |
| JP | 2001-243112 A | 9/2001 |
| JP | 2006-072449 A | 3/2006 |

* cited by examiner

*Primary Examiner* — Kevin Ellis
*Assistant Examiner* — Aracelis Ruiz
(74) *Attorney, Agent, or Firm* — Arent Fox LLP

(57) ABSTRACT

An area detection unit detects a main rectangular area to which an access start address indicated by one-dimensional access information is included among main rectangular areas corresponding to two-dimensional access information. An address conversion unit divides the detected main rectangular area into sub rectangular areas, detects a sub rectangular area to which the access start address indicated by the one-dimensional access information is included, and converts the one-dimensional access information into first two-dimensional access information based on a relative position of the sub rectangular area being detected. A memory controller receives the first and second two-dimensional access information, and converts the two-dimensional access information into an access address. Accordingly, a modification of a memory controller accessing a semiconductor memory by receiving the two-dimensional access information becomes unnecessary. As a result, existing design properties can be effectively utilized, and a development period of a system can be reduced.

10 Claims, 8 Drawing Sheets

SEMICONDUCTOR INTEGRATED CIRCUIT AND ACCESS CONTROLLING METHOD OF SEMICONDUCTOR MEMORY

CROSS-REFERENCE TO RELATED APPLICATION

This application is based upon and claims the benefit of the prior International Application No. PCT/JP2007/000273, filed on Mar. 20, 2007, the entire contents of which are incorporated herein by reference.

FIELD

The present embodiments relate to a semiconductor integrated circuit to access a semiconductor memory storing data as two-dimensional data corresponding to two-dimensional access information.

BACKGROUND

Generally, it is often the case that a system such as a digital camera processing image data deals data as two-dimensional data in a matrix state. It is often the case that access information indicating a position of data to be accessed is also represented in two dimension in this kind of system. On the other hand, for example, data areas are assigned corresponding to addresses increasing sequentially, in a semiconductor memory such as an SDRAM storing image data and so on. Namely, access information (address) to access the data stored in the semiconductor memory is represented in one dimension.

Japanese Laid-open Patent Publication No. 2001-243112 and Japanese Laid-open Patent Publication No. 63-234361 describes a memory control device (semiconductor integrated circuit) converting two-dimensional access information into one-dimensional access information to access a semiconductor memory by using two-dimensional access information dealt in a system is proposed.

Recently, a function of a system processing image data is improved, and a system dealing both two-dimensional access information and one-dimensional access information is also proposed. On the other hand, a memory capacity of a semiconductor memory increases, and it may be possible to store data read/written by two-dimensional access information and data read/written by one-dimensional access information, in one semiconductor memory.

In such a case, it may be necessary for a semiconductor control device provided in a system controlling an access of the semiconductor memory, to access the semiconductor memory by using the one-dimensional access information and the two-dimensional access information. Further, it may be necessary to newly develop a conversion process unit mutually accessing data read/written from/to the semiconductor memory to enable to access the data area accessed by the two-dimensional access information by using the one-dimensional access information, or to enable to access the data area accessed by the one-dimensional access information by using the two-dimensional access information. In this case, it may be necessary to modify an interface unit of an existing data process unit (IP core) in accordance with an interface of the newly developed conversion process unit. A verification work of a design data may become necessary again if the IP core is modified only for a bit. As a result, a development period of the system becomes long, and a development cost increases because a design change and the verification work of the existing IP core may become necessary in addition to the development period of the new memory control device.

A proposition of the present embodiments is to shorten a development period of a system and to reduce a development cost of the system by effectively utilizing existing design properties.

SUMMARY

An area detection unit detects a main rectangular area to which an access start address indicated by one-dimensional access information output from at least one of a one-dimensional access process units is included among a plurality of main rectangular areas corresponding to two-dimensional access information. An address conversion unit divides the main rectangular area detected by the area detection unit into a plurality of sub rectangular areas, and detects a sub rectangular area to which the access start address indicated by the one-dimensional access information is included. Further, the address conversion unit converts the one-dimensional access information into first two-dimensional access information based on a relative position of the sub rectangular area including the access start address when a start address of the main rectangular area being detected is used as a reference. A memory controller receives the first two-dimensional access information converted by the address conversion unit and second two-dimensional access information output from a two-dimensional access process unit, and converts the first and second two-dimensional access information being received into an access address to access a semiconductor memory.

It may be possible to use the memory controller accessing the semiconductor memory by receiving the two-dimensional access information as it is without modifying it, by converting the one-dimensional access information into the first two-dimensional access information. Besides, it may not be necessary to modify neither the one-dimensional access process unit nor the two-dimensional access process unit. Accordingly, existing design properties can be effectively utilized when the one-dimensional access process unit and the two-dimensional access process unit access similar semiconductor memory. As a result, a development period of a system may be reduced and a development cost of the system may be reduced.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Hereinafter, embodiments are described with reference to the drawings.

Figure 1:
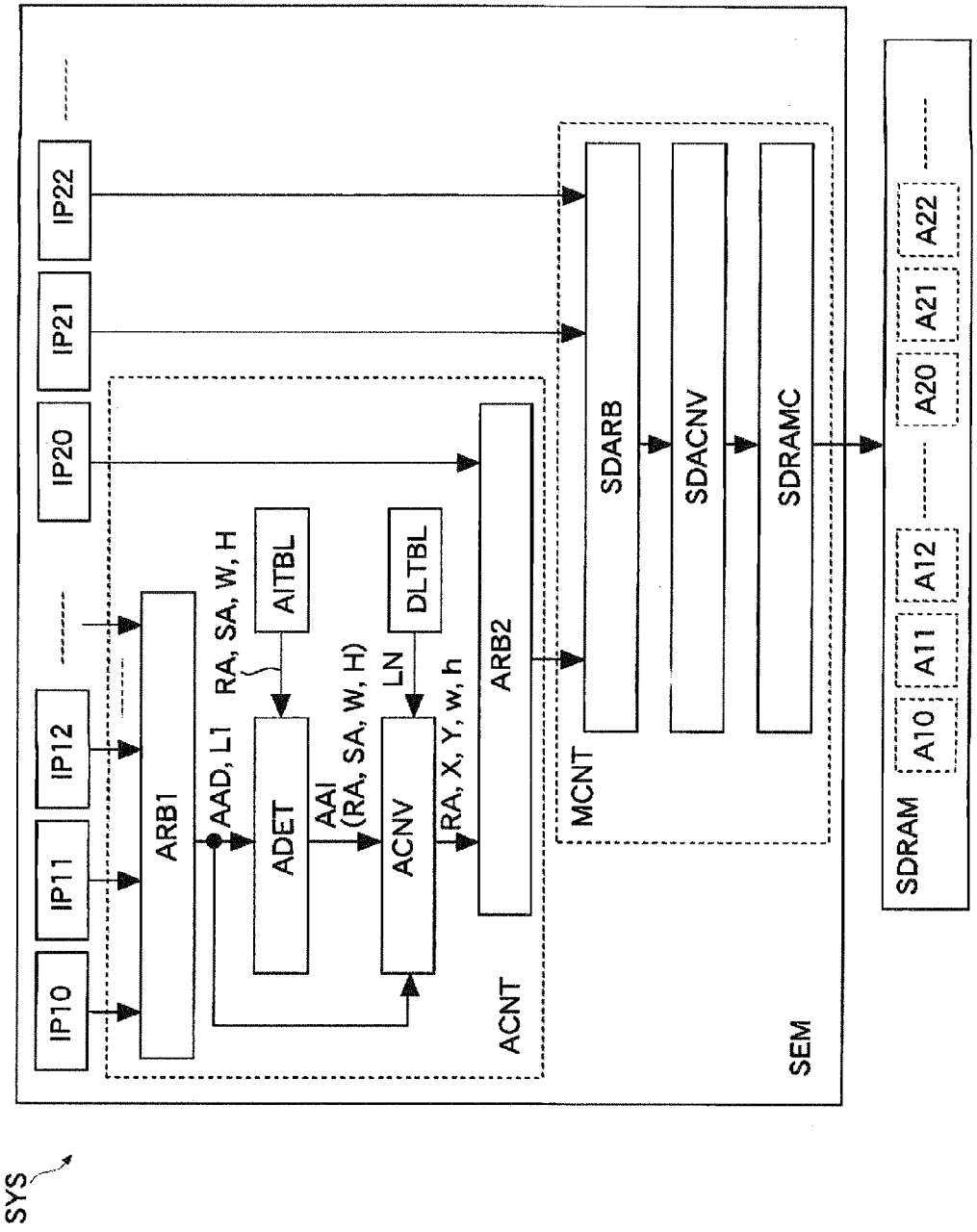
FIG. 1 is a block diagram illustrating a first embodiment.

FIG. 1 illustrates a first embodiment. A system SYS of this embodiment is provided as, for example, a portable equipment such as a digital camera. The system SYS has a semiconductor integrated circuit SEM and an SDRAM. The system SYS has an imaging device photographing images, a monitor displaying the images, an operation switch, and so on though they are not illustrated in particular. The semiconductor integrated circuit SEM has plural IP10, IP11, IP12, IP20, IP21, IP22 (IP cores), an access control unit ACNT, and a memory controller MCNT. Incidentally, components fundamental for the embodiment are illustrated in FIG. 1. Accordingly, only a later-described transmission path of access information is illustrated, and a description of a transmission path of data and so on is not given.

The IP10-12 operate as one-dimensional access process units accessing the SDRAM by using one-dimensional access information. The IP20-22 operate as two-dimensional access process units accessing the SDRAM by using two-dimensional access information. The one-dimensional access information and the two-dimensional access information are described in FIG. 2. In this example, the IP10-12 are data process units processing still image data such as JPEG data, frame image data overlapped on image data, or the like. Concretely speaking, the IP10-12 have functions performing processes such as trimming of images, enlargement and reduction of images, a conversion process of image colors, a two-dimensional FIR filtering, a noise reduction of image or a display of image on a display. When these processes are performed by using the two-dimensional access information, the one-dimensional access process unit has a function to convert the two-dimensional access information used for the process into the one-dimensional access information. The IP20-22 are data process units processing moving image data and so on such as MPEG data. The IP10-12, IP20-22 designed at a development time of another system are usable.

The access control unit ACNT has an arbiter ARB1, an area detection unit ADET, an address conversion unit ACNV, an area information table AITBL, a divided line table DLTBL and an arbiter ARB2. The arbiter ARB1 decides a priority order of access requests when the access requests from the IP10-12 (one-dimensional access information) conflict, and outputs the access requests to the area detection unit ADET in a decided order. The IP10-12 and the arbiter ARB1 output an access start address AAD and an access data size L1 as the one-dimensional access information.

The area detection unit ADET outputs access area information AAI being rectangular area information "RA, SA, W, H" including the one-dimensional access information (AAD, L1) supplied from the arbiter ARB1 based on information of a main rectangular area RA, a start address SA, a width W and a height H stored in the area information table AITBL.

The address conversion unit ACNV retrieves a divided line number LN dividing the height H included in the access area information AAI from the divided line table DLTBL, and outputs the one-dimensional access information (AAD, L1) while converting into first two-dimensional access information (the main rectangular area RA, access start coordinates X, Y, a width w and a height h to be accessed). The access start coordinates X, Y are coordinates corresponding to the access start address AAD, and they are relative coordinates from a start address (starting point) of the main rectangular area RA. The width w, the height h are the width and the height of the rectangular area to be accessed when the coordinates X, Y are the starting point.

The arbiter ARB2 decides a priority order of access requests when the access requests from the address conversion unit ACNV and the IP20 (the first and second two-dimensional access information) conflict, and outputs the access requests to the memory controller MCNT in a decided order. It may be possible to supply the plural access requests supplied from the IP10-12 or the access request supplied from the IP20 to one input port of the memory controller MCNT by providing the arbiters ARB1, ARB2 inside the access control unit ACNT. Accordingly, it may not be necessary to modify the memory controller MCNT even if the number of mounted IPs increases. Namely, it may be possible to design the semiconductor integrated circuit SEM by effectively using existing design properties (IP10-12, IP20-22 and memory controller MCNT). Incidentally, when the IP20 is coupled to a later-described arbiter SDARB by modifying the arbiter SDARB so as to increase the number of ports, it may not be necessary to form the arbiter ARB2 inside the address conversion unit ACNV. A judgment whether the arbiter ARB2 is to be designed or the arbiter SDARB is to be modified is determined by considering a design/verification period. Besides, the area information table AITBL and the divided line table DLTBL may be made up of rewritable hardware such as a register, and they may be stored as a work data to be accessible by software.

The memory controller MCNT has the arbiter SDARB, an address conversion unit SDACNV, and a memory controller SDRAMC. The memory controller MCNT may be coupled to three IPs dealing the two-dimensional access information, and the one designed at a development time of another system is usable. The arbiter SDARB decides a priority order of access requests when the access requests from the access control unit ACNV and the IP21-22 (the first and second two-dimensional access information) conflict, and outputs the access requests to the address conversion unit SDACNV in a decided order. The address conversion unit SDACNV converts the two-dimensional access information from the arbiter SDARB into an access command and an access address of the SDRAM, and outputs to the memory controller SDRAMC.

The memory controller SDRAMC converts and outputs the access request (access command and access address) into a command and an address to perform an access operation of the SDRAM. For example, the command is represented by a combination of logics of a row address strobe signal /RAS, a column address strobe signal /CAS, and a write enable signal /WE. The address is represented by a bank address signal, a row address signal and a column address signal received in synchronization with the command. For example, the bank address signal/the row address signal and the column address signal are transmitted via similar address bus line. Incidentally, the memory controller SDRAMC outputs a write data from the IP core to the SDRAM when the access request represents a write command, and outputs a read data from the SDRAM to the IP core when the access request represents a read command.

The SDRAM has, for example, areas A10-12, A20-22 assigned so as to respectively correspond to the IP10-12, IP20-22. However, the areas A10-12, A20-22 are mutually accessible by the other IPs, as it is described later.

Figure 2:
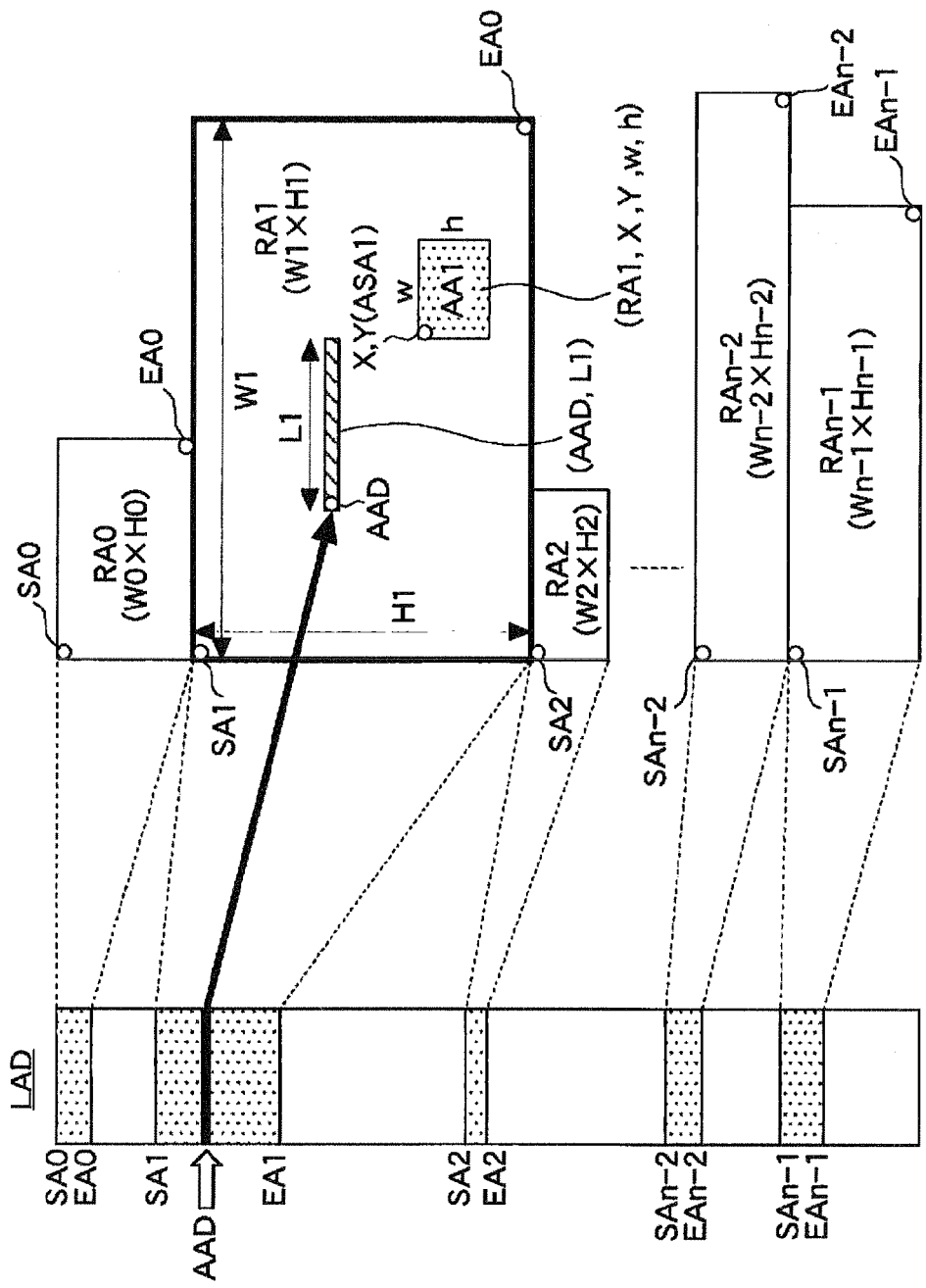
FIG. 2 is an explanatory view illustrating an assignment example of rectangular areas of the first embodiment.

FIG. 2 illustrates an assignment example of the rectangular areas RA of the first embodiment. The n-pieces of rectangular areas RA (RA0, RA1, RA2, ..., RAn−2, RAn−1) illustrated in FIG. 2 are assigned to, for example, the IP20-22. Accordingly, these rectangular areas RA are normally accessed by the two-dimensional access information. However, in the present embodiment, they are also able to be freely accessed from the IP10-12 outputting the one-dimensional access information owing to the access control unit ACNT.

Each rectangular area RA is assigned on an address map (linear address LAD) of the SDRAM. Each rectangular area RA is defined by the start address SA, the width W and the height H of the rectangular area RA. The start address SA is a physical address (absolute address) on the linear address LAD. Incidentally, an end address EA is indicated so as to correspond to the map of the linear address LAD, and it is not a parameter defining the rectangular area RA. Tailing numbers of the start addresses SA, the widths W, the heights H and the end addresses EA in FIG. 2 correspond to the numbers of the rectangular areas RA. The parameters such as the rectangular area RA, the start address SA, the width W and the height H are stored in a nonvolatile memory such as a flash memory mounted on the system SYS as a table (the area information table AITBL illustrated in FIG. 3) at a manufacturing time of the system SYS. Otherwise, these parameters are defined at a design time of the semiconductor integrated circuit SEM, and values thereof are programmed in a hard wired logic (combination circuit), a ROM such as a fuse, a nonvolatile register and a nonvolatile latch made up of a ferroelectric memory cell, or the like.

For example, an access area AA1 illustrated by a half-tone dot meshing inside the rectangular area RA1 represents an area accessed by the IP20. The IP20 outputs the rectangular area RA1, access start coordinates (X, Y), a width w of an area to be accessed and a height h of the area to be accessed as the two-dimensional access information. The access start coordinates (X, Y) are relative coordinates when the start address SA is set as a starting point. Incidentally, an access start address ASA1 being a relative value for the start address SA may be used instead of the access start coordinates (X, Y).

On the other hand, for example, the IP10 outputs the access start address AAD and the access data size L1 to access a predetermined area of the rectangular area RA1. The access start address AAD is a physical address (absolute address) on the linear address LAD. Accordingly, it is conventionally necessary for the IP10 to access the SDRAM by using an access control unit (access process unit) exclusively processing the one-dimensional access information. Otherwise, it may be necessary to newly develop an access control unit capable of mutually converting the one-dimensional access information and the two-dimensional access information and to modify an interface of the IP10 in accordance with an interface of the access control unit.

Figure 3:
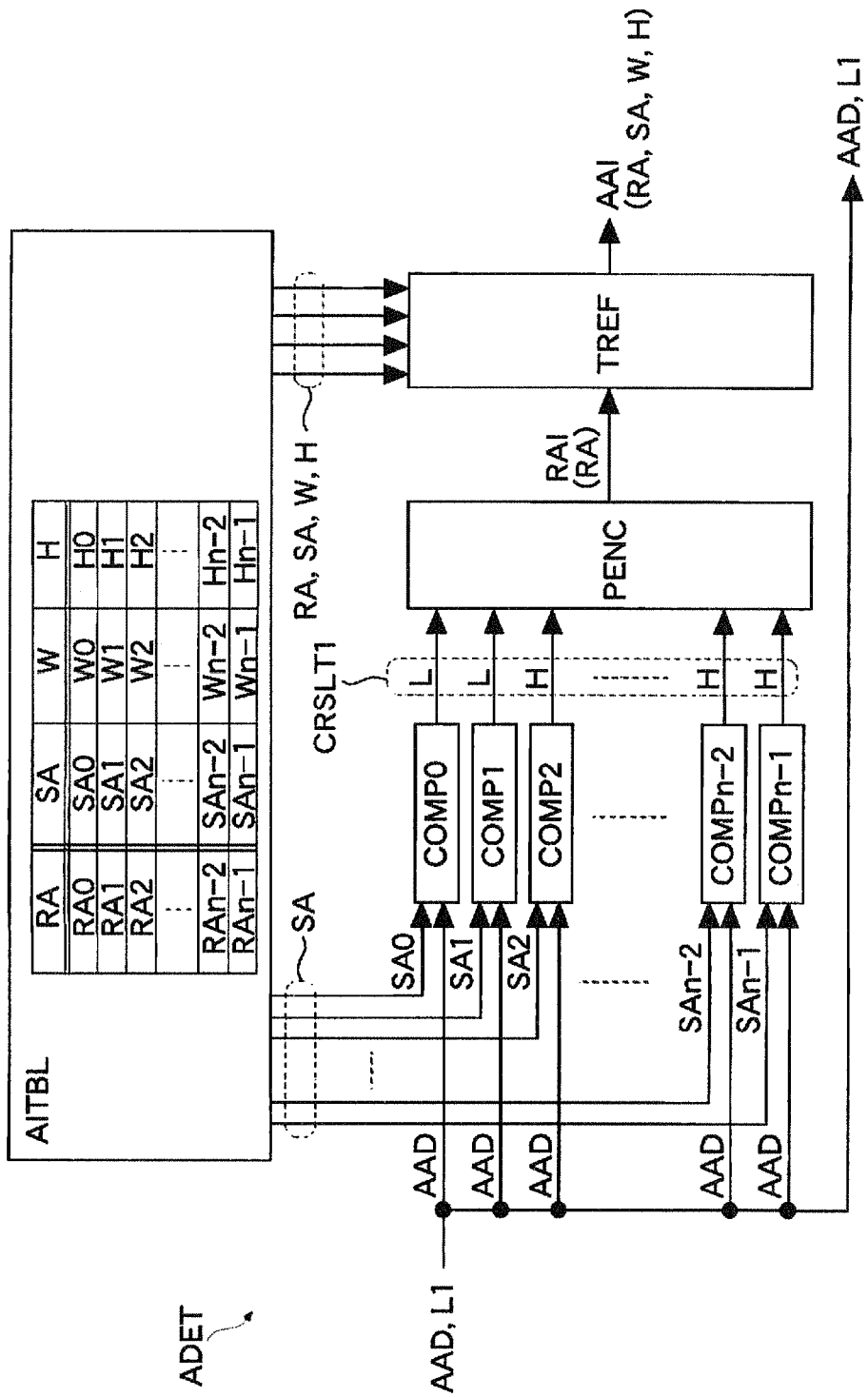
FIG. 3 is a block diagram illustrating a detail of an area detection unit illustrated in FIG. 1.

FIG. 3 illustrates a detail of the area detection unit ADET illustrated in FIG. 1. The area detection unit ADET has plural comparators COMP0-COMPn−1 corresponding to the rectangular areas RA0-RAn−1, a priority encoder PENC and a table reference unit TREF. The area information table AITBL referred to by the area detection unit ADET is stored in, for example, the flash memory and so on mounted inside the system SYS as it is described above. The area information table AITBL may be built in the semiconductor integrated circuit SEM as hardware (the above-stated hard wired logic, ROM, register and latch, or the like).

The comparators COMP0-COMPn−1 compare the access start address AAD (one-dimensional access information) with the start addresses SA0-SAn−1 corresponding to the rectangular areas RA0-RAn−1 received from the area information table AITBL, and output comparison results CRSLT1. When the access start address AAD is equal to or larger than the start address SA of each rectangular area RA, the comparison result CRSLT1 in low level L is output. When the access start address AAD is smaller than the start address SA of each rectangular area RA, the comparison result CRSLT1 in high level H is output. The levels H/L indicated at the comparison results CRSLT1 in FIG. 3 represent an example in which the access start address AAD is included in the rectangular area RA1, as illustrated in FIG. 2.

The priority encoder PENC outputs rectangular area information RAI indicating the rectangular area RA including the access start address AAD based on the comparison results CRSLT1. Concretely speaking, the priority encoder PENC outputs the rectangular area information RA1 indicating the rectangular area RA (RA1, in this case) corresponding to the comparator COMP outputting the L level between the adjacent comparators COMP (COMP1-2, in this case) outputting the L level and the H level.

The table reference unit TREF reads the rectangular area RA indicated by the rectangular area information RAI, the start address SA, the width W and the height H corresponding to this rectangular area RA out of the area information table AITBL, and outputs as the access area information AAI. As stated above, the area detection unit ADET receives the access start address AAD which is output by the IP10-12 dealing the one-dimensional access information to access the SDRAM, detects the rectangular area RA including the access start address AAD, and outputs as the access area information AAI. The priority encoder PENC and the table reference unit TREF operate as a detection control unit detecting the rectangular area RA including the access start address AAD based on the outputs CRSLT1 of the comparators COMP0-COMPn−1, and outputting the access area information AAI indicating the detected rectangular area RA to the address conversion unit ACNV.

Figure 4:
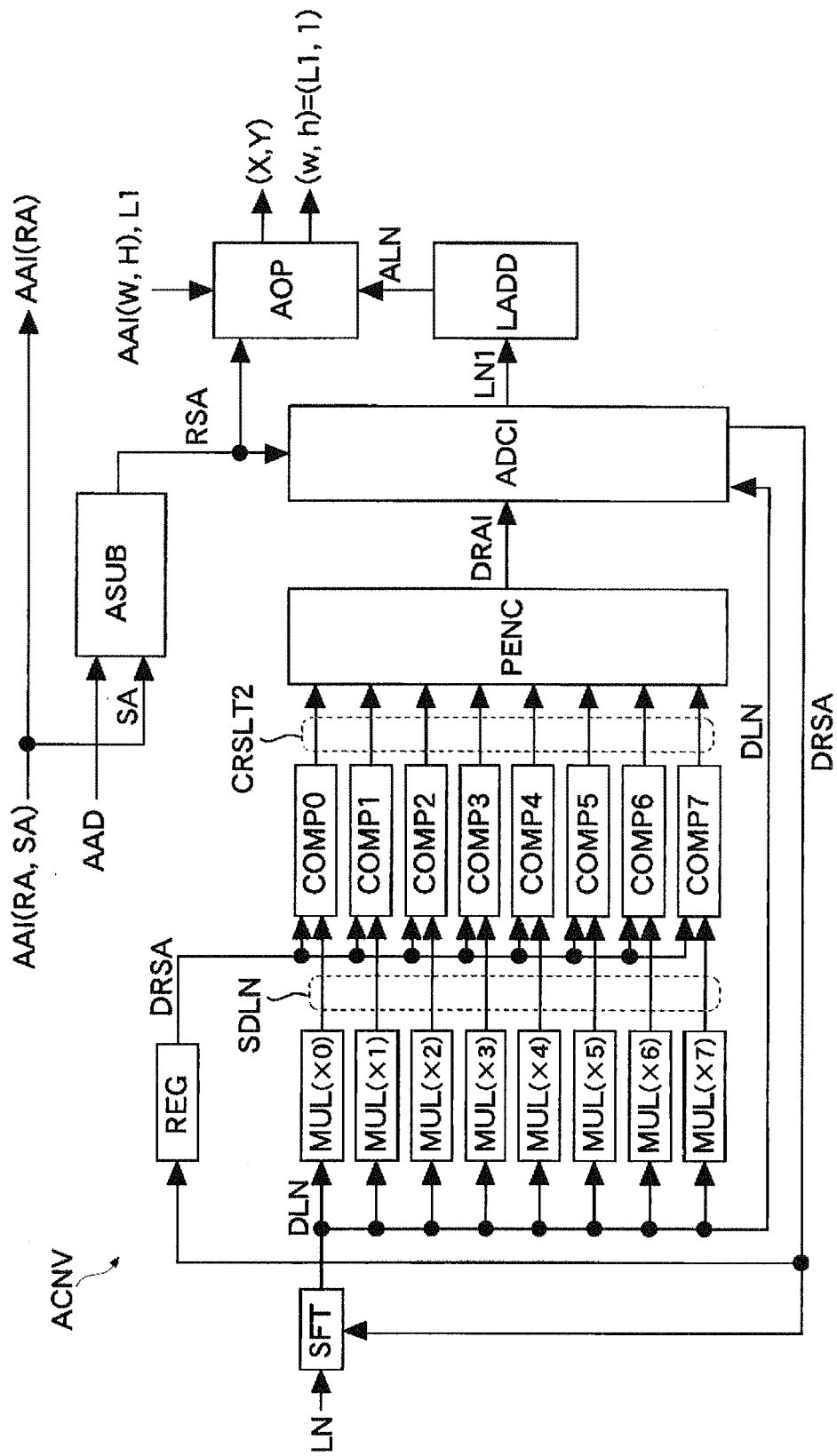
FIG. 4 is a block diagram illustrating a detail of an address conversion unit illustrated in FIG. 1.

FIG. 4 illustrates a detail of the address conversion unit ACNV illustrated in FIG. 1. The address conversion unit ACNV has a shifter SFT, a register REG with a loading function, eight pieces of constant multipliers MUL, eight pieces of comparators COMP0-7, the priority encoder PENC, an address subtracter ASUB (relative address detection unit), an area decision unit ADCI, a line addition unit LADD and an address operation unit AOP.

Figure 6:
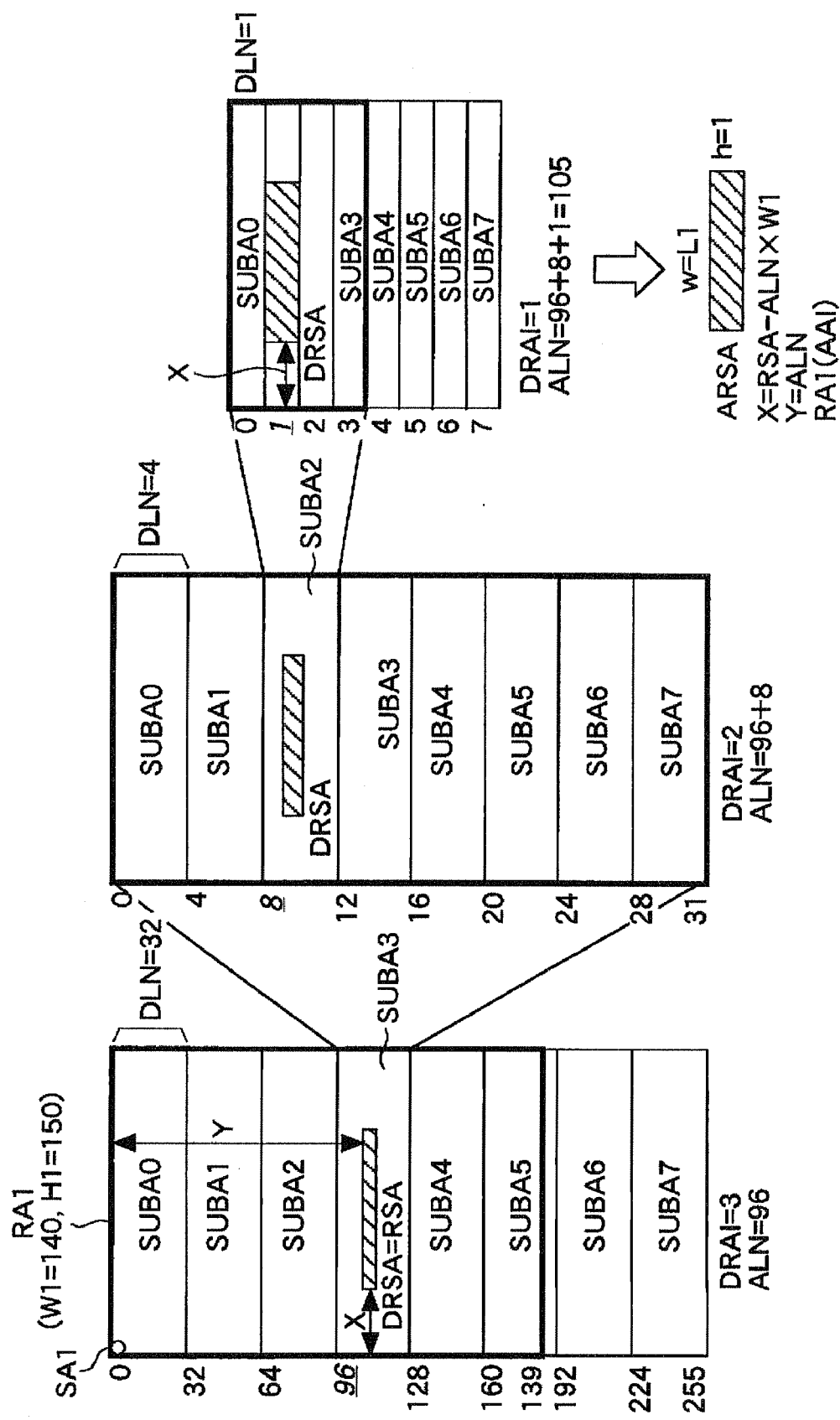
FIG. 6 is an explanatory view illustrating an example of the operations of the address conversion unit illustrated in FIG. 3.

The shifter SFT retrieves the divided line number LN of the rectangular area RA in the height H direction included in the access area information AAI from the divided line table DLTBL under an initial state before an address conversion, and outputs the retrieved divided line number LN as a divided line number DLN. The divided line numbers LN being factorials of two are stored in the divided line table DLTBL. The shifter SFT retrieves the divided line number LN having a value in which a minimum value equal to or larger than the height H (which is the factorial of two) included in the access area information AAI is divided by eight. For example, when a height H1 of the rectangular area RA1 is 150 lines as illustrated in FIG. 6, the minimum value becomes 256, and the divided line number LN is set as 32. Besides, the shifter SFT divides the held current divided line number DLN by eight, and outputs as a new divided line number DLN in synchronization with an output timing of a relative start address DRSA output from the area decision unit ADCI. Namely, the shifter SFT shifts the divided line number DLN represented by a binary number for three bits toward lower side by every decision time of the area decision unit ADCI.

The register REG holds the relative start address DRSA from the area decision unit ADCI, and outputs to the comparators COMP0-7. Here, the relative start address DRSA is the one representing the access start address AAD by a relative value from a start address of the rectangular area RA, or a relative value from a start address of a sub rectangular area SUBA in which the rectangular area RA is divided into plural. Each of the constant multipliers MUL multiplies the divided line number DLN by zero, two, three, ..., seven, and outputs to the corresponding comparators COMP0-7 as sub divided line numbers SDLN. For example, when the divided line number DLN is 32, each of the constant multipliers MUL outputs the sub divided line numbers SDLN representing 0, 32, 64, 96, ..., 192, 224.

The comparators COMP0-7 compare the relative start address DRSA with the sub divided line numbers SDLN output from the multipliers MUL, and output comparison results CRSLT2. Operations of the comparators COMP0-7 are similar to the operations of the comparators COMP0-COMPn−1 illustrated in FIG. 3. Namely, when the relative start address DRSA is equal to or larger than each of the sub divided line numbers SDLN, the comparison result CRSLT2 in low level L is output. When the relative start address DRSA is smaller than each of the sub divided line numbers SDLN, the comparison result CRSLT2 in high level H is output. The priority encoder PENC operates as similar as the priority encoder PENC illustrated in FIG. 3, and outputs divided rectangular area information DRAI indicating the sub rectangular area SUBA including the relative start address DRSA based on the comparison results CRSLT2.

The address subtracter ASUB subtracts the start address SA of the rectangular area RA included in the access area information AAI from the access start address AAD, and obtains a relative start address RSA. The relative start address RSA is the one representing the access start address AAD by a relative value from the start address SA of the rectangular area RA.

The area decision unit ADCI outputs the relative start address RSA received from the subtracter ASUB as the relative start address DRSA under the initial state before the divided rectangular area information DRAI is received. Besides, the area decision unit ADCI calculates a line number LN1 (height) to the start address of the sub rectangular area SUBA (indicated by the divided rectangular area information DRAI) including the relative start address RSA at a decision operation time, to output to the line addition unit LADD. Further, the area decision unit ADCI converts the relative start address DRSA calculated at the last time into a value represented by a relative value from a start address of the new sub rectangular area SUBA indicated by the newly received divided rectangular area information DRAI, and outputs the converted value as the relative start address DRSA at a decision operation time at a second time or later. The line addition unit LADD accumulates the line numbers LN1, and outputs an accumulated value as an accumulation line number ALN.

The address operation unit AOP operates when the area decision unit ADCI conducts the last decision, namely, when the divided line number DLN becomes one. The area decision unit ADCI calculates the accumulation line number ALN, the width W of the rectangular area RA, the coordinate X in the width direction corresponding to the relative start address RSA, and sets the accumulation line number ALN as the coordinate Y in the height direction corresponding to the relative start address RSA. The coordinate X is calculated by subtracting a product of the accumulation line number ALN and the width W from the relative start address RSA. The width w of the area to be accessed is output as the access data size L1 (one-dimensional access information), and the height h of the area to be accessed is output as one. Namely, the two-dimensional access information (RA, X, Y, w, h) converted from the one-dimensional access information (AAD, L1) is output from the address conversion unit ACNV.

Figure 5:
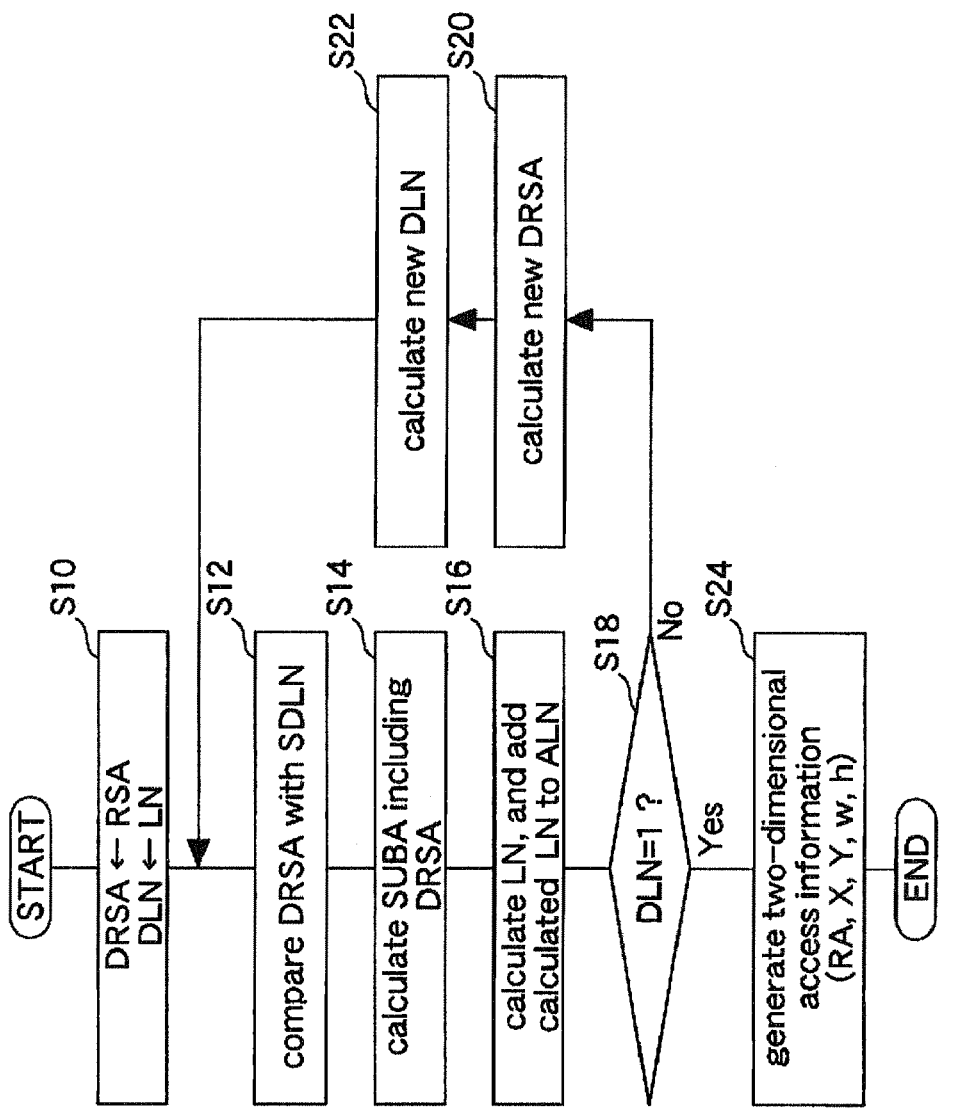
FIG. 5 is a flowchart illustrating operations of the address conversion unit illustrated in FIG. 3.

FIG. 5 illustrates operations of the address conversion unit ACNV illustrated in FIG. 3. The operations illustrated in FIG. 5 indicate from the time when the access area information AAI is received from the area detection unit ADET to the time when the two-dimensional access information (RA, X, Y, w, h) is output. Incidentally, the operations of the address conversion unit ACNV may also be enabled not by hardware but by software. In this case, the operations of the address conversion unit ACNV are enabled by a controller such as a CPU mounted on the system SYS executing an address conversion program corresponding to the flow illustrated in FIG. 5.

At first, in step S10, the relative start address RSA calculated by the address subtracter ASUB is held by the register REG as the relative start address DRSA. Besides, the divided line number LN read out of the divided line table DLTBL is taken into the shifter SFT as the divided line number DLN.

Next, in step S12, the relative start address DRSA are compared with the sub divided line numbers SDLN output from the constant multipliers MUL, and magnitude relations thereof are decided. In step S14, the sub rectangular area SUBA including the relative start address DRSA is calculated based on the comparison results CRSLT2, and it is output as the divided rectangular area information DRAI.

Next, in step S16, the line number LN1 to the start address of the calculated sub rectangular area SUBA is calculated to be added to the accumulation line number ALN. In step S18, it is decided whether or not the divided line number DLN becomes one. Namely, it is decided whether or not the position of the relative start address RSA is calculated to a one line unit. When the divided line number DLN is larger than one line, the process shifts to step S20. When the divided line number DLN is one line, the process shifts to step S24.

In the step S20, a new relative start address DRSA is calculated based on the start address (starting point) of the sub rectangular area SUBA. In step S22, a new divided line number DLN is calculated so as to assign further smaller new sub rectangular areas SUBA by dividing the sub rectangular area SUBA. Subsequently, the processes in the steps S12, S14, S16 are performed again. Namely, the divided rectangular area information DRAI is recursively calculated by sequentially making the size of the sub rectangular area SUBA small. On the other hand, when the divided line number DLN is one line, the two-dimensional access information (RA, X, Y, w, h) is generated and output in the step S24. Operation processes are performed recursively while gradually making the size of the sub rectangular area SUBA to be divided small, and thereby, a size of the address conversion unit ACNV may be made small. Accordingly, it may be possible to make a chip size of the semiconductor integrated circuit SEM small, and to reduce the cost of the system SYS.

FIG. 6 illustrates an example of operations of the address conversion unit ACNV illustrated in FIG. 3. In this example, the access start address AAD of the one-dimensional access information is included in the rectangular area RA1 as illustrated in FIG. 2. Accordingly, the address conversion unit ACNV receives the access area information AAI (RA1, SA1, W1, H1) of the rectangular area RA1 from the area detection unit ADET. For example, the width W1, the height H1 of the rectangular area RA1 are respectively 140, 150.

At first, the divided line number DLN is set at 32 because the height H1 of the rectangular area RA1 is 140 (from "0" (zero) to 139) in a left side map of FIG. 6. Namely, eight pieces of sub rectangular areas SUBA0-7 are assigned. The rectangular area RA1 is included in the sub rectangular areas SUBA0-5. Here, the relative start address DRSA (it is similar to RSA at a first time) is included in the sub rectangular area SUBA3, and therefore, the divided rectangular area information DRAI (=3) indicating the sub rectangular area SUBA3 is output. Besides, 96 is calculated as the line number LN1 to a start address of the sub rectangular area SUBA3. The line addition unit LADD resets the accumulation line number ALN to zero at the first operation time, and therefore, the accumulation line number ALN is also set at 96.

Next, the relative start address DRSA is converted into a value represented by a relative value from the start address of the sub rectangular area SUBA3, in a center map of FIG. 6. Besides, the sub rectangular area SUBA3 is divided into new eight pieces of sub rectangular areas SUBA0-7, and the divided line number DLN is set at four in one-eighths.

The sub rectangular area SUBA2 including the relative start address DRSA is then detected (DRAI=2). Eight is calculated as the line number LN1 to a start address of the newly calculated sub rectangular area SUBA2, and it is accumulated to the accumulation line number ALN (96+8).

Next, the relative start address DRSA is converted into a value represented by a relative value from the start address of the sub rectangular area SUBA2, in a right side map of FIG. 6. The sub rectangular area SUBA2 is made up of four lines, and therefore, it corresponds to four pieces among eight pieces of the newly divided sub rectangular areas SUBA0-7. The divided line number DLN is set at one in which 0.5 (a value in which four is divided by eight) is rounded up. The new sub rectangular area SUBA1 including the relative start address DRSA is then detected (DRAI=1). A final accumulation line number ALN (=105) is asked in which the calculated line number LN1 (=1) is added.

The final accumulation line number ALN represents a relative position of the sub rectangular area SUBA1 detected at the last time in the height direction H when the start address SA of the rectangular area RA including the access start address AAD is used as a reference. The divided line number DLN is one, and therefore, the address conversion process is completed. The RA=RA1, X=RSA−ALN×W1, Y=ALN, w=L1, h=1 are obtained as the two-dimensional access information. Accordingly, it may be possible to access the SDRAM by using the one-dimensional access information and the two-dimensional access information. Namely, the IP10-12, the IP20-22 are able to mutually access the areas A10-12, A20-22 of the SDRAM.

Figure 7:
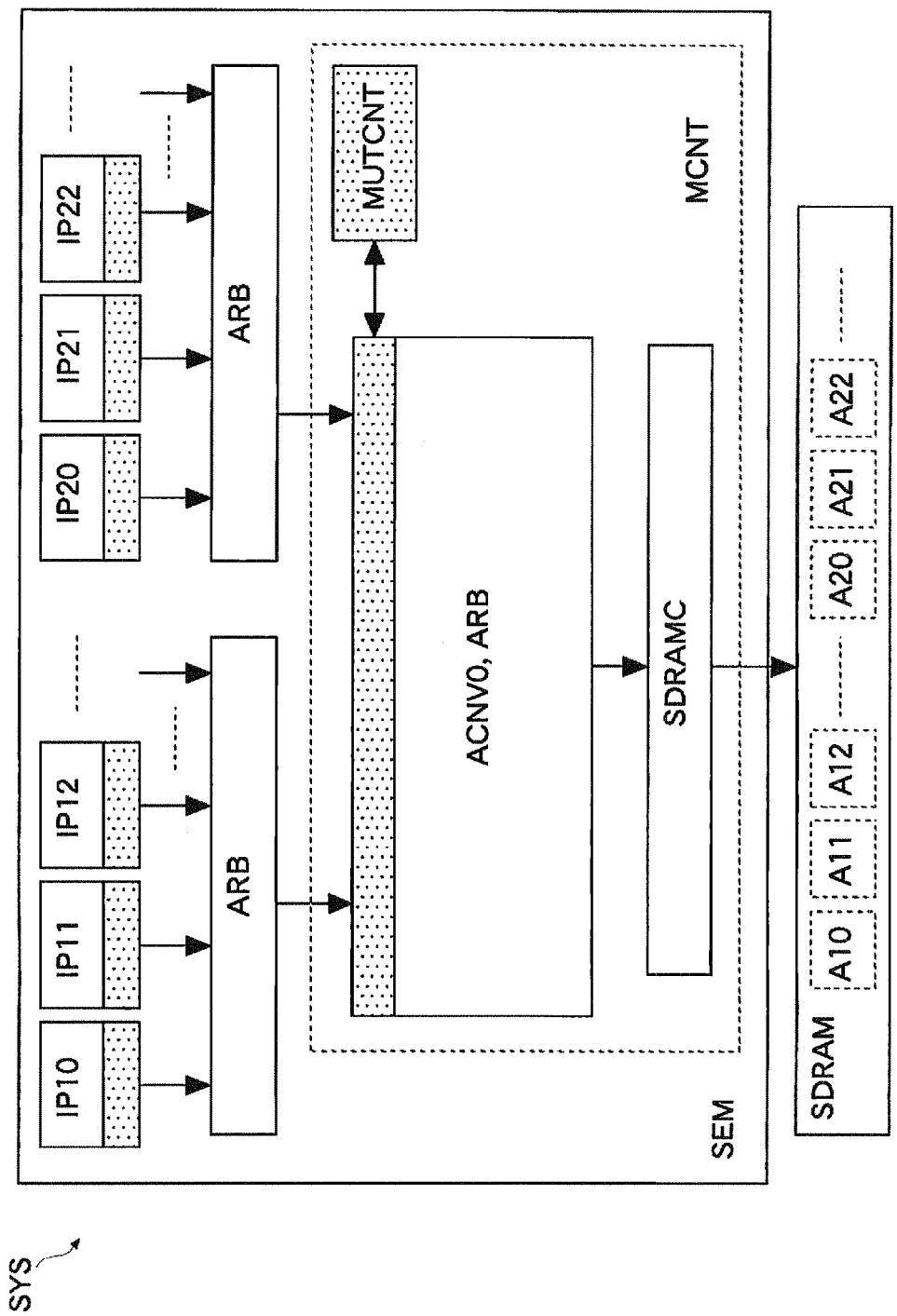
FIG. 7 is a block diagram illustrating an outline of a semiconductor integrated circuit having a memory controller.

FIG. 7 illustrates an outline of the semiconductor integrated circuit SEM having the memory controller MCNT. Similar reference numerals and symbols are used to designate similar and corresponding elements in FIG. 1. An ARB is an arbiter adjusting the access requests. In this example, an address conversion unit ACNV0 is designed by combining a memory controller processing the one-dimensional access information from the IP10-12 and a memory controller processing the two-dimensional access information from the IP20-22. However, in this case, it may be necessary to modify interfaces of the IP10-12, IP20-22 in accordance with an interface of the address conversion unit ACNV0 to make the newly designed address conversion unit ACNV0 commonly usable by the IP10-12, IP20-22. As a result, it may be necessary to perform the verification works of the design data of the IP10-12, IP20-22 again.

Further, it may be necessary to newly design a mutual access control unit MUTCNT to mutually convert the one-dimensional access information and the two-dimensional access information so that the areas A10-12 accessed by the IP10-12 dealing the one-dimensional access information and the areas A20-22 accessed by the IP20-22 dealing the two-dimensional access information are made mutually accessible independent of the IP core.

As stated above, a development period of the system SYS becomes long and the development cost increases because the design change and the verification work of the existing IPs become necessary in addition to the new circuit design in FIG. 7. Further, latency when the SDRAM is accessed becomes long and data transfer efficiency decreases in the access request operating the mutual access control unit MUTCNT.

As stated above, in the first embodiment, the access requests from the IP10-12 (one-dimensional access information) are converted into the two-dimensional access information having similar format as the access requests from the IP20-22, and thereby, the memory controller MCNT for the two-dimensional access information may be used as it is without any modification. Besides, it is not necessary to modify the IP10-12, IP20-22.

Accordingly, the existing design properties may be used efficiently in the system SYS in which the SDRAM is commonly accessed by the IP10-12, IP20-22. Re-verifications of the design data of the memory controller MCNT and the IP10-12, IP20-22 are not necessary, and therefore, the development period of the system SYS may be shortened, and the development cost of the system SYS may be reduced.

It may be possible to easily detect the main rectangular area RA including the access start address AAD by comparing the magnitude between the access start address AAD and each of the start addresses SA of the main rectangular areas RA. Similarly, it may be possible to easily detect the sub rectangular area SUBA including the access start address AAD by respectively comparing the magnitude between the access start address AAD and each of the start addresses of the sub rectangular areas SUBA.

Figure 8:
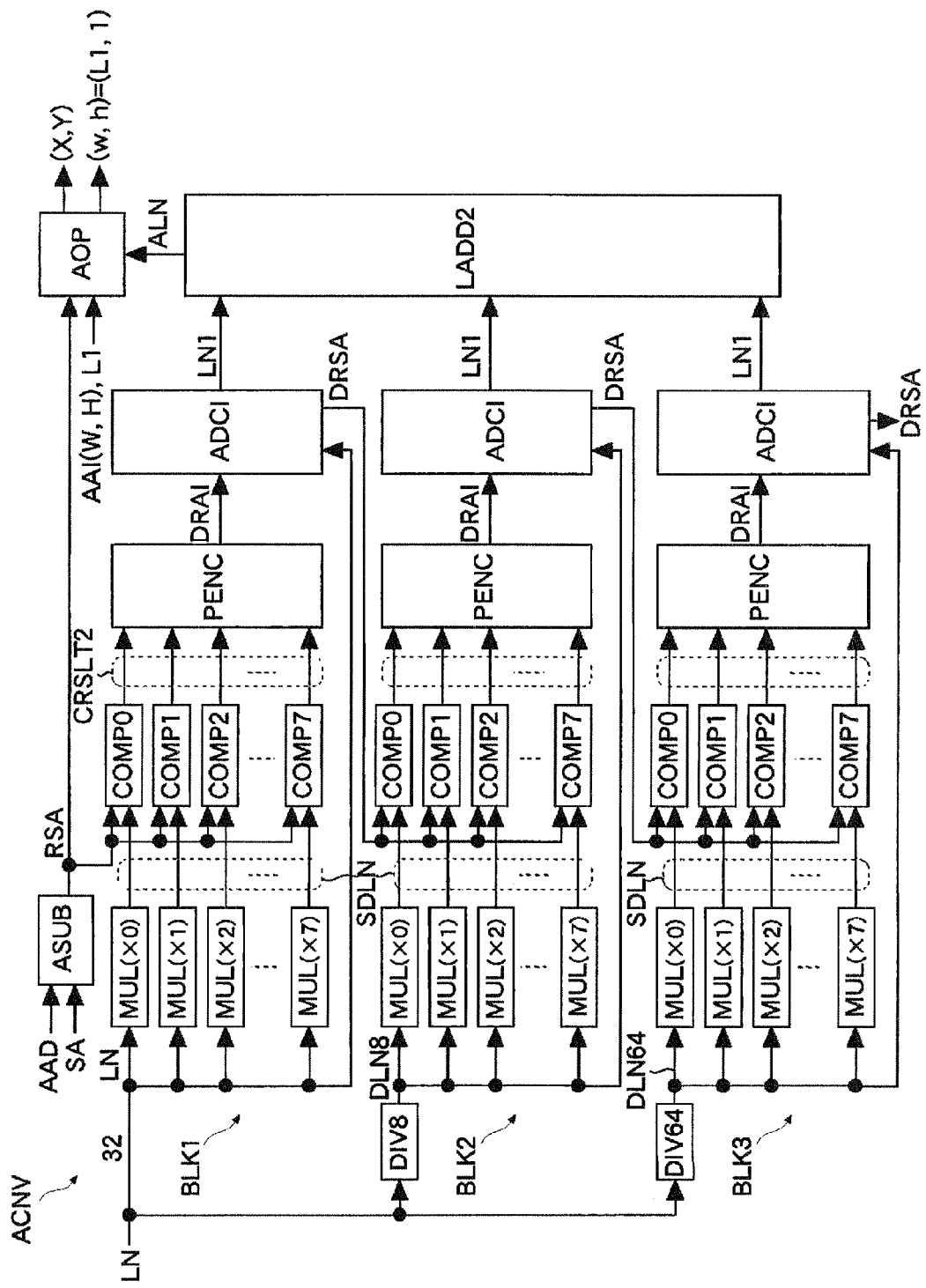
FIG. 8 is a block diagram illustrating an address conversion unit of a second embodiment.

FIG. 8 illustrates an address conversion unit ACNV in a second embodiment. Similar reference numerals and symbols are used to designate similar and corresponding elements in the first embodiment, and detailed description thereof will not be given. In this embodiment, process blocks BLK1, BLK2, BLK3 each made up of the constant multipliers MUL of the address conversion unit ACNV, the comparators COMP0-7, the priority encoder PENC and the area decision unit ADCI of the first embodiment, are disposed in series. The other constitution is similar to the first embodiment. Namely, the semiconductor integrated circuit SEM has the plural IP10, IP11, IP12, IP20, IP21, IP22, the access control unit ACNT and the memory controller MCNT as illustrated in FIG. 1. The system SYS is provided as the portable equipment such as the digital camera, and has the semiconductor integrated circuit SEM and the SDRAM.

The process block BLK1 uses the divided line number LN (for example, 32) corresponding to the height H of the rectangular area RA to be accessed. The process block BLK2 uses a divided line number DLN8 (for example, 4) in which the divided line number LN is divided by eight by using a divider DIV8. The process block BLK3 uses a divided line number DLN64 (a positive integer number; for example, "1") in which the divided line number LN is divided by 64 by using a divider DIV64. The process block BLK2 (BLK3) compares the relative start address DRSA generated by the higher process block BLK1 (BLK2) with the sub divided line number SDLN. A line addition unit LADD2 calculates the accumulation line number ALN all at once by using the line numbers LN1 output from three area decision units ADCI.

As stated above, it is also possible to obtain the similar effect as the above-stated first embodiment in the second embodiment. Further, in this embodiment, it may be possible to obtain the two-dimensional access information (RA, X, Y, w, h) without performing the recursive process, and therefore, the conversion time from the one-dimensional access information to the two-dimensional access information can be reduced. As a result, the access efficiency of the SDRAM can be improved.

Incidentally, in the above-stated embodiment, the example is described in which the area including the access start address AAD is detected by dividing the rectangular area RA or the sub rectangular area SUBA into eight parts in a line direction. The present invention is not limited to such an embodiment. For example, the number of division can be set at an arbitrary value. Besides, the initial divided line number LN is not limited to 32, but it may be any number as long as it is the factorial of two (for example, 16, 64).

In the above-stated embodiment, the example is described in which the present invention is applied to the semiconductor integrated circuit SEM having the memory controller MCNT accessing the SDRAM. The present invention is not limited to the embodiment. For example, the semiconductor memory being the access object may be a DRAM, an SRAM or a ferroelectric memory. Aforementioned embodiments may be applicable for a semiconductor integrated circuit accessing a semiconductor memory storing data as two-dimensional data corresponding to two-dimensional access information.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A semiconductor integrated circuit, comprising:
    at least one of a one-dimensional access process units outputting one-dimensional access information;
    an area detection unit detecting a main rectangular area to which an access start address indicated by the one-dimensional access information is included among a plurality of main rectangular areas corresponding to two-dimensional access information;
    an address conversion unit dividing the main rectangular area detected by the area detection unit into a plurality of sub rectangular areas, detecting a sub rectangular area to which the access start address indicated by the one-dimensional access information is included, and converting the one-dimensional access information into first two-dimensional access information based on a relative position of the sub rectangular area including the access start address when a start address of the main rectangular area being detected is used as a reference;
    at least one of a two-dimensional access process units outputting second two-dimensional access information; and
    a memory controller converting the first two-dimensional access information and the second two-dimensional access information into an access address to access a semiconductor memory.

2. The semiconductor integrated circuit according to claim 1, wherein
    the area detection unit includes
    a plurality of first comparators each comparing the access start address included in the one-dimensional access information and start addresses of the plurality of main rectangular areas, and
    a detection control unit detecting the main rectangular area including the access start address based on outputs of the first comparators and outputting address area information indicating the main rectangular area being detected to the address conversion unit.

3. The semiconductor integrated circuit according to claim 1, wherein
    the address conversion unit includes
    a relative address detection unit calculating a relative start address corresponding to the access start address included in the one-dimensional access information while using the start address of the main rectangular area detected by the area detection unit as a reference,
    a plurality of second comparators each comparing the relative start address and start addresses of the plurality of sub rectangular areas, and
    a conversion control unit detecting the sub rectangular area including the access start address based on outputs of the second comparators, and converting the one-dimensional access information into the first two-dimensional access information based on the relative position of the sub rectangular area including the access start address when the start address of the main rectangular area being detected is used as a reference.

4. The semiconductor integrated circuit according to claim 3, wherein
    the address conversion unit further divides the sub rectangular area detected by the conversion control unit, and performs recursive processes in which the second comparators compare start addresses of divided sub rectangular areas with the relative start address of the access start address included in the one-dimensional access information until a height of the sub rectangular area becomes one line.

5. The semiconductor integrated circuit according to claim 1, further comprising:
    an arbiter receiving a plurality of one-dimensional access information output from a plurality of the one-dimensional access process units, deciding a priority order of the plurality of one-dimensional access information when the plurality of one-dimensional access information conflict, and outputting the plurality of one-dimensional access information to the area detection unit in a decided order.

6. The semiconductor integrated circuit according to claim 1, further comprising:
    an arbiter receiving the first two-dimensional access information being converted output from the address conversion unit and the second two-dimensional access information output from one of the two-dimensional access process units, deciding a priority order of the first and second two-dimensional access information being received when the first and second two-dimensional access information being received conflict, and outputting the first and second two-dimensional access information being received to the memory controller in a decided order.

7. An access controlling method accessing a semiconductor memory in accordance with one-dimensional access information output from at least one of a one-dimensional access process units and two-dimensional access information output from at least one of a two-dimensional access process units, the access controlling method comprising:

detecting a main rectangular area to which an access start address indicated by the one-dimensional access information output from the one of one-dimensional access process units is included among a plurality of main rectangular areas corresponding to the two-dimensional access information;

dividing the main rectangular area being detected into a plurality of sub rectangular areas;

detecting a sub rectangular area to which the access start address is included;

converting the one-dimensional access information into first two-dimensional access information based on a relative position of the sub rectangular area including the access start address when a start address of the main rectangular area being detected is used as a reference; and converting the first two-dimensional access information being converted and second two-dimensional access information output from one of the two-dimensional access process units into an access address to access the semiconductor memory.

8. The access controlling method according to claim 7, wherein
the detection of the main rectangular area including the access start address is performed by comparing the access start address included in the one-dimensional access information and each of start addresses of the plurality of main rectangular areas.

9. The access controlling method according to claim 7, wherein
the detection of the sub rectangular area including the access start address is performed by calculating a relative start address corresponding to the access start address included in the one-dimensional access information while using the start address of the main rectangular area being detected as a reference, and by comparing the relative start address and each of start addresses of the plurality of sub rectangular areas.

10. The access controlling method according to claim 9, further comprising:
further dividing the sub rectangular area being detected, and performing recursive processes in which start addresses of divided sub rectangular areas are compared with the relative start address of the access start address included in the one-dimensional access information until a height of the sub rectangular area becomes one line.

* * * * *